United States Patent
Krause

(10) Patent No.: US 10,419,339 B2
(45) Date of Patent: Sep. 17, 2019

(54) ROUTER TO SEND A REQUEST FROM A FIRST SUBNET TO A SECOND SUBNET

(71) Applicant: HEWLETT PACKARD ENTERPRISE DEVELOPMENT LP, Houston, TX (US)

(72) Inventor: Michael R. Krause, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 24 days.

(21) Appl. No.: 15/500,078

(22) PCT Filed: Jan. 22, 2015

(86) PCT No.: PCT/US2015/012344
§ 371 (c)(1),
(2) Date: Jan. 30, 2017

(87) PCT Pub. No.: WO2016/118128
PCT Pub. Date: Jul. 28, 2016

(65) Prior Publication Data
US 2017/0250909 A1    Aug. 31, 2017

(51) Int. Cl.
*H04L 12/741*  (2013.01)
*H04L 12/715*  (2013.01)
*H04L 29/06*   (2006.01)

(52) U.S. Cl.
CPC ............ *H04L 45/74* (2013.01); *H04L 45/04* (2013.01); *H04L 63/08* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 7,334,071 B2 | 2/2008 | Onufryk et al. | |
| 8,370,834 B2* | 2/2013 | Edwards | G06F 9/5077 709/238 |
| 8,521,941 B2 | 8/2013 | Regula | |
| 8,571,045 B2 | 10/2013 | Gurdan et al. | |
| 8,713,128 B2 | 4/2014 | Teener et al. | |
| 8,793,411 B1 | 7/2014 | Balkan et al. | |
| 9,483,422 B2* | 11/2016 | Hadley | G06F 21/54 |
| 9,824,049 B1* | 11/2017 | Serebrin | G06F 13/4027 |
| 2004/0205253 A1* | 10/2004 | Arndt | G06F 12/1491 710/1 |
| 2007/0204031 A1 | 8/2007 | Alstad et al. | |
| 2014/0337522 A1 | 11/2014 | Kuntschke et al. | |

(Continued)

OTHER PUBLICATIONS

Benedict, Melvin K.; International Appl. No. PCT/US2014/62849 entitled Trans-Fabric Instruction Set for a Communication Fabric; filed Oct. 29, 2014;44 pages.

(Continued)

*Primary Examiner* — Kibrom T Hailu
(74) *Attorney, Agent, or Firm* — Rathe Lindenbaum LLP

(57) ABSTRACT

A router receives a request including a first memory address from a source node in a first subnet. The router translates the first memory address in the request to a second memory address that is different from the first memory address. The router sends the request including the second memory address to a target node in the second subnet.

19 Claims, 9 Drawing Sheets

(56) References Cited

U.S. PATENT DOCUMENTS

| | | | |
|---|---|---|---|
| 2015/0261709 A1* | 9/2015 | Billi | G06F 13/4022 |
| | | | 710/316 |
| 2016/0119773 A1* | 4/2016 | Xu | H04M 15/8038 |
| | | | 455/432.2 |

OTHER PUBLICATIONS

Benedict, Melvin K.; International Application PCT/US2014/62848 entitled Including Node and Process Identifiers in a Transaction; filed Oct. 29, 2014; 41 pages.

Edwards, Nigel; International Appl. No. PCT/US2014/61934 entitled Admissions Control of a Device; filed Oct. 23, 2014;41 pages.

Krause, Michael R.,; International Appl. PCT/US2014/47760 entitled Delayed Read Indication; filed Jul. 23, 2014;36 pages.

Krause, Michael; International Appl. No. PCT/US2014/13738 entitled Migrating Data Between Memories; filed Jan. 30, 2014;44 pages.

PLX Technology; Non-transparent Bridging Simplified, (Web Page); Apr. 14, 2005; 4 Pages.

Regula, J.; Using Non-transparent Bridging in PCI Express Systems, (Web Page);Feb. 19, 2008; 31 Pages.

International Search Report and Written Opinion; PCT/US20145/12344; dated Oct. 20, 2015; 12 pages.

\* cited by examiner

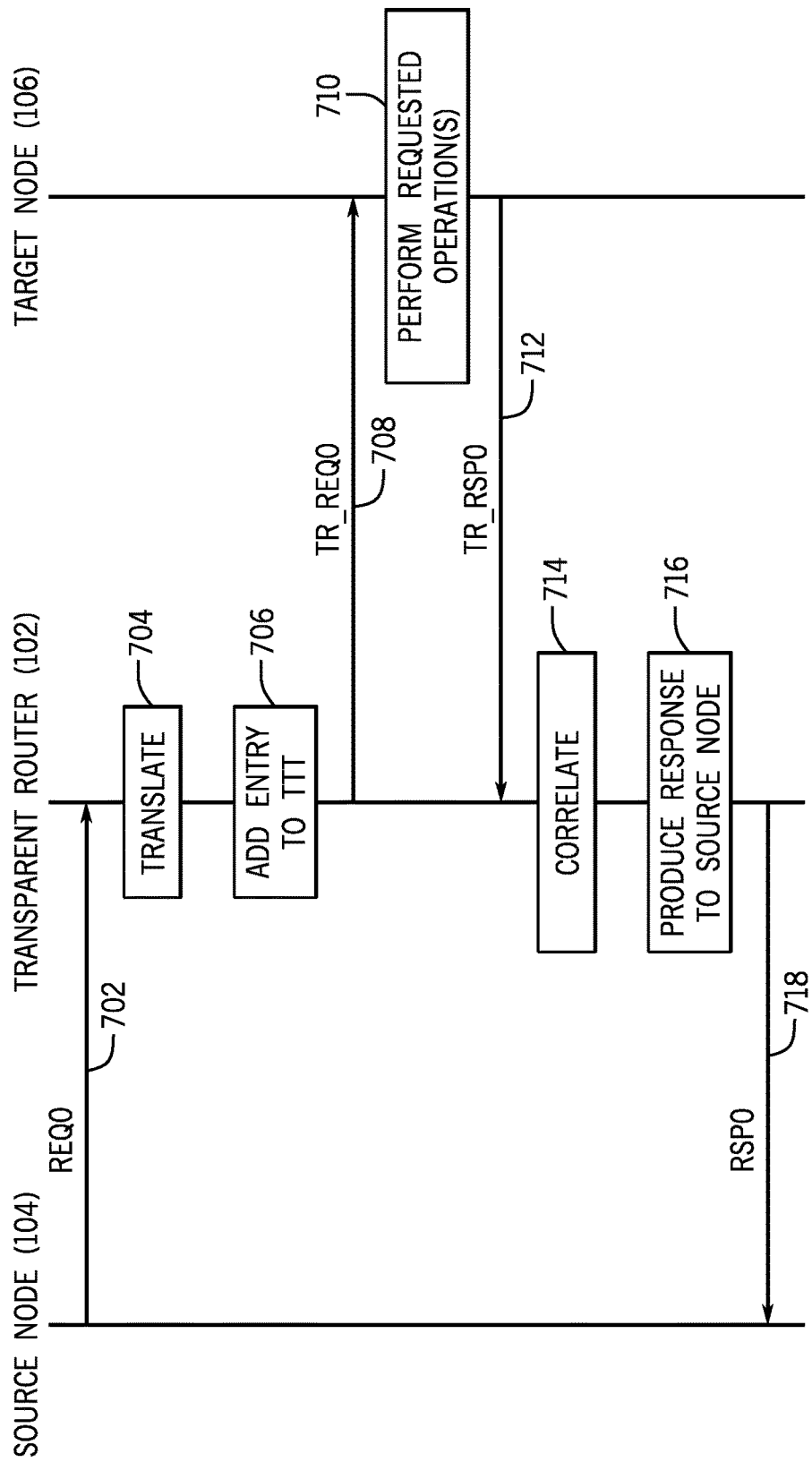

ROUTER TO SEND A REQUEST FROM A FIRST SUBNET TO A SECOND SUBNET

BACKGROUND

A system, such as a computer or other type of system, can include various types of devices. Such devices can include a processor, an input/output device, a memory device, and other devices. The processor or I/O device can issue memory access commands over a memory bus to the memory device. The memory device can respond by sending data to the requesting processor or I/O device over the memory bus.

BRIEF DESCRIPTION OF THE DRAWINGS

Some implementations are described with respect to the following figures.

FIG. 7 is a message flow diagram of an example process involving a source node, a transparent router, and a target node, according to further implementations.

DETAILED DESCRIPTION

To achieve relatively low latency and high bandwidth, a communication fabric can support memory semantic operations. A "communication fabric" can refer to communication links and communication nodes used to communicate data between source and target nodes that are coupled to the communication links and communication nodes.

A "memory semantic operation" can refer to an operation that employs memory requests to communicate between a source node and a target node. For example, the source node can be a processor, while the target node can be a memory (volatile memory or non-volatile memory). A memory request can include a read request, a write request, an atomic operation request, or other type of request, which can be issued by the source node to access data in the target node. The target node responds to a memory request with a response (or multiple responses).

In other examples, a source node can include a different type of electronic component, such as a graphics controller, an input/output (I/O) controller, a network interface controller, a computer, and so forth, while a target node can also include any of the foregoing devices. More generally, a source node or target node can include an entire machine (e.g. a computer, storage system, communication system, a handheld device such as a smartphone or personal digital assistant, a game appliance, etc.), or alternatively, a source node or target node can include one or a combination of electronic components within a machine (e.g. a processor, a memory device, a persistent storage device, a graphics controller, an I/O controller, a network interface controller, etc.).

A communication fabric that provides communications using memory semantic operations can be associated with a lower overhead than a communication fabric that provides communications based on use of traditional network protocols, such as the Transmission Control Protocol (TCP) and/or the Internet Protocol (IP). Network protocols can define formats and procedures for communication of data over communication fabrics. The defined formats can include protocol headers with specified fields, which can take up a relatively large amount of space and thus can lead to increased overhead. The larger overhead of network protocols can result in increased latency and reduced bandwidth in network communications.

A network environment can include multiple subnets. A "subnet" can refer to a logical subdivision of a larger network. Different subnets can employ separate address spaces. Each subnet can include a respective group of endpoint nodes. Traditionally, use of memory semantic operations in a network environment that includes multiple subnets may not be practical.

Figure 1:
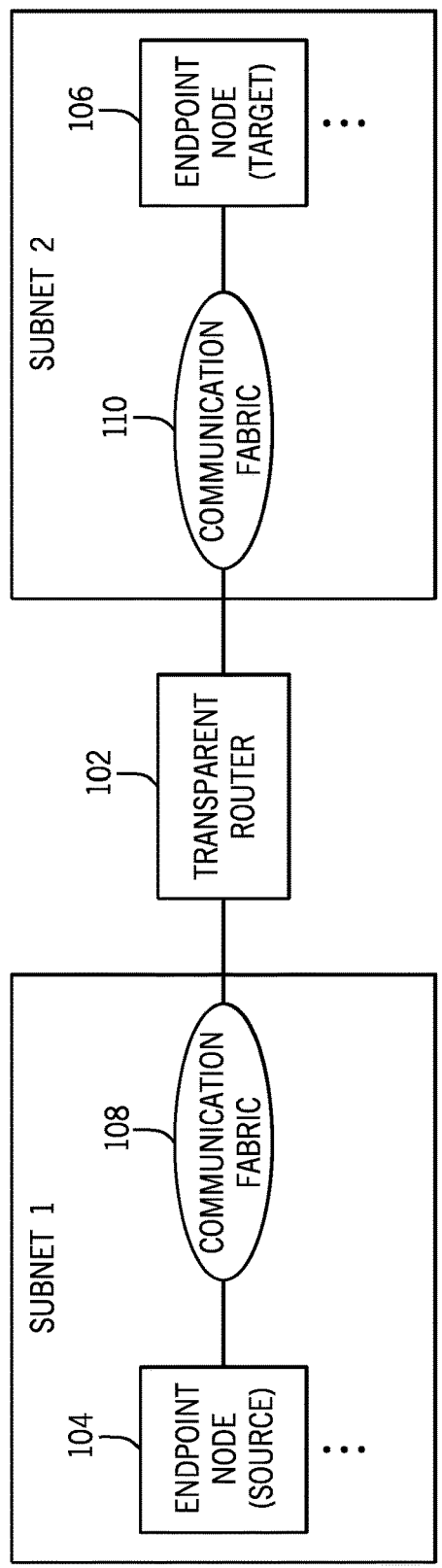
FIG. 1 is a block diagram of an example arrangement including a transparent router connected between subnets, in accordance with some implementations.

In accordance with some implementations of the present disclosure, as shown in FIG. 1, a router 102 is provided between subnets (e.g. subnet 1 and subnet 2) to support memory semantic operations between endpoint nodes located in different subnets. Although just two subnets are depicted in FIG. 1, it is noted that in other examples, more than two subnets may be present in a network environment that includes communication fabric(s) according to the present disclosure. Communications between endpoint nodes in different subnets (e.g. an endpoint node 104 in subnet 1 and an endpoint node 106 in subnet 2) can pass through the router 102. In some examples, the router 102 is referred to as a transparent router, which enables interconnection of multiple subnets without endpoint nodes in one subnet being aware of endpoint nodes in another subnet.

Although FIG. 1 depicts just one endpoint node in each subnet, it is noted that a subnet can include multiple endpoint nodes. In the ensuing discussion, reference is made to the endpoint node 104 as being a "source node," and the endpoint node 106 as being a "target node." The source node 104 is the node that initiates a particular transaction with a request, and the target node 106 responds to the request with a response. Note that for other transactions, the endpoint node 104 can be a target node, while the endpoint node 106 can be a source node.

For a given transaction, the transparent router 102 appears as a target node in a first subnet and as a source node in a second subnet. In the example of FIG. 1, the router 102 appears as the target node to the source node 104 in subnet 1, while the router 102 appears as a source node to the target node 106 in subnet 2. For the given transaction, the source node 104 submits a request to the transparent router 102 as the target, while for the same given transaction, the transparent router 102 is the source that submits the request to the target node 106.

The transparent router 102 maintains the illusion that an endpoint node is communicating with a local subnet endpoint node, even though a transaction initiated by a source node (e.g. source node 104) involves endpoint nodes in multiple subnets (e.g. source node 104 and target node 106 in subnets 1 and 2, respectively).

Subnet 1 includes a communication fabric 108 that allows endpoint nodes in subnet 1 to communicate with each other and with the transparent router 102. Similarly, subnet 2 includes a communication fabric 110 that allows endpoint nodes in subnet 2 to communicate with each other and with the transparent router 102. The communication fabrics of the subnets support memory semantic operations, as discussed above.

Figure 2:
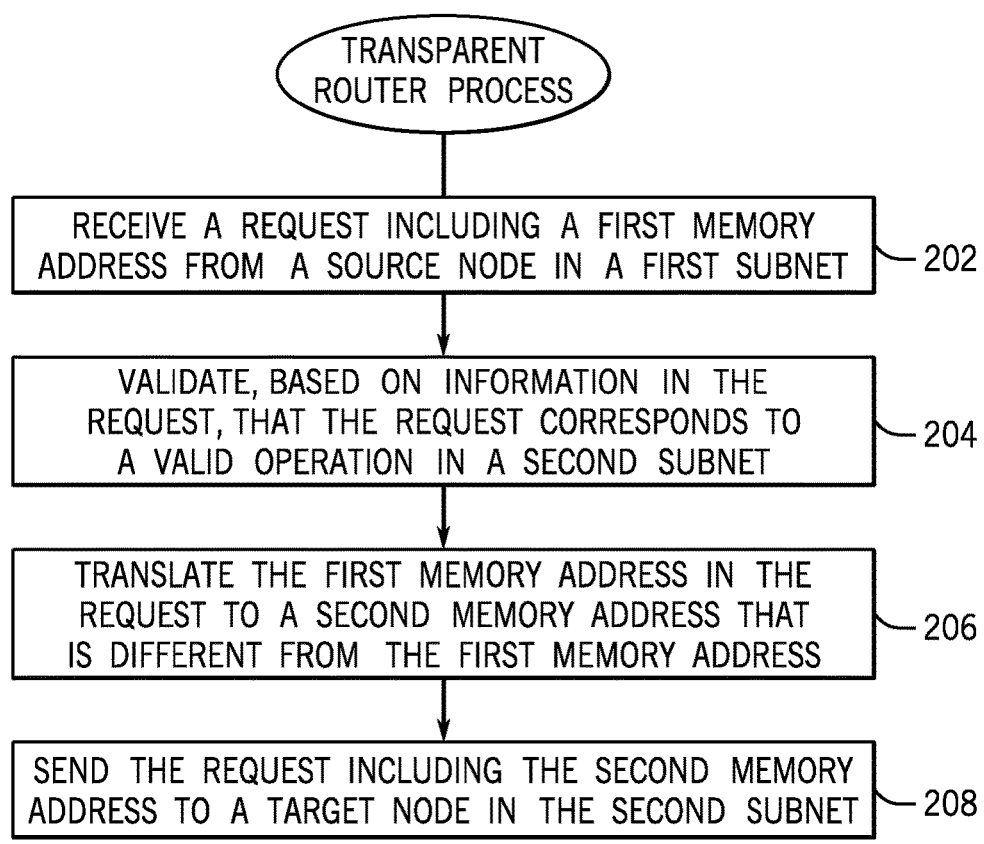
FIG. 2 is a flow diagram of an example process performed by a transparent router according to some implementations.

FIG. 2 is a flow diagram of a process performed by the transparent router 102, according to some implementations. The transparent router 102 receives (at 202) a request including a first memory address from the source node 104 in subnet 1. A memory address is used to identify a storage location in a target node, such as a memory device, a persistent storage device, or another type of target node.

The transparent router 102 validates (at 204), based on information in the request, that the request corresponds to a valid operation in subnet 2. The validating is based on performance of a validation procedure that includes validating an access key (if present) in the request and an operation code (OpCode) in the request. In other examples, the validation procedure can validate other field(s) in the request, discussed further below.

A request can include an access key field to store an access key. An access key can be an identifier used to provide access privileges to a specified resource (or resources) associated with a target node. A resource can include any or some combination of the following: a memory region of a memory device (or memory devices), a storage region of a persistent storage device (or storage devices), an electronic component or a portion of an electronic component (e.g. a processor, a switch, a programmable gate array (PGA), a digital signal processor (DSP), a general processing unit (GPU), etc.), an accelerator (which is an entity that is used to perform computations on behalf of another device), a shared I/O component (e.g. a network or storage controller, a graphics controller, etc.), an ingress or egress interface, and so forth.

If a given resource is associated with an access key, then any request targeting the given resource that does not contain the access key in the access key field of the request will violate resource permissions and can trigger an access violation error. If an access key is included in the access key field of the request, the access key in the access key field of the request is compared to the access key associated with the given resource, to determine whether access of the given resource can be granted. Thus, using the access key in the request, a validation procedure determines whether the access key in the request authorizes an operation in a subnet that is the target of the request. Including the access key in the access key field provides an explicit specification of the access key. In other examples, an access key can be implicitly indicated; if a transaction packet does not contain an access key field, then the transparent router 102 can either apply a subnet-local access key or can specify that use of a default access key is permitted at the target node.

An operation code (or OpCode) can specify a specific operation to be performed. The operation code can be included in an OpCode field of a request. Examples of operations that can be specified by an operation code include a read operation, a write operation, and so forth.

A validation procedure can validate whether the operation code included in the request is for a valid operation. In some examples, this can be based on comparing the operation code included in the request with a data structure (referred to as an "OpCode set structure") that contains a set of supported operation codes. Any operation code that does not match the set of supported operation codes in the OpCode set structure is marked as an un-supported operation code, and the validation procedure indicates an error. The OpCode set structure can be in the form of a table, a list, or any other type of data structure.

The validation procedure performed by the transparent router 102 can include other types of validations. For example, the validation procedure can validate an address in the address field to ensure that the address maps to an address supported in the peer subnet. There are other fields that can be validated as part of transaction validation, such as data integrity fields, etc.

If the validation procedure produces an error, the transparent router 102 can perform error processing in response to the validation error, where the error processing can include taking one or multiple actions to address the error.

The transparent router 102 translates (at 206) the first memory address in the request to a second memory address that is different from the first memory address. The first memory address is within an address space of subnet 1, while the second memory address is within an address space of subnet 2, where the address spaces of subnets 1 and 2 are different from each other.

The transparent router 102 sends (at 208) the request that includes the second memory address to the target node 106 in subnet 2. The request received by the target node 106 causes the target node 106 to perform an operation (or operations) as specified by the request, where the operation(s) can include a read operation, a write operation, both read and write operations, and so forth.

Figure 3:
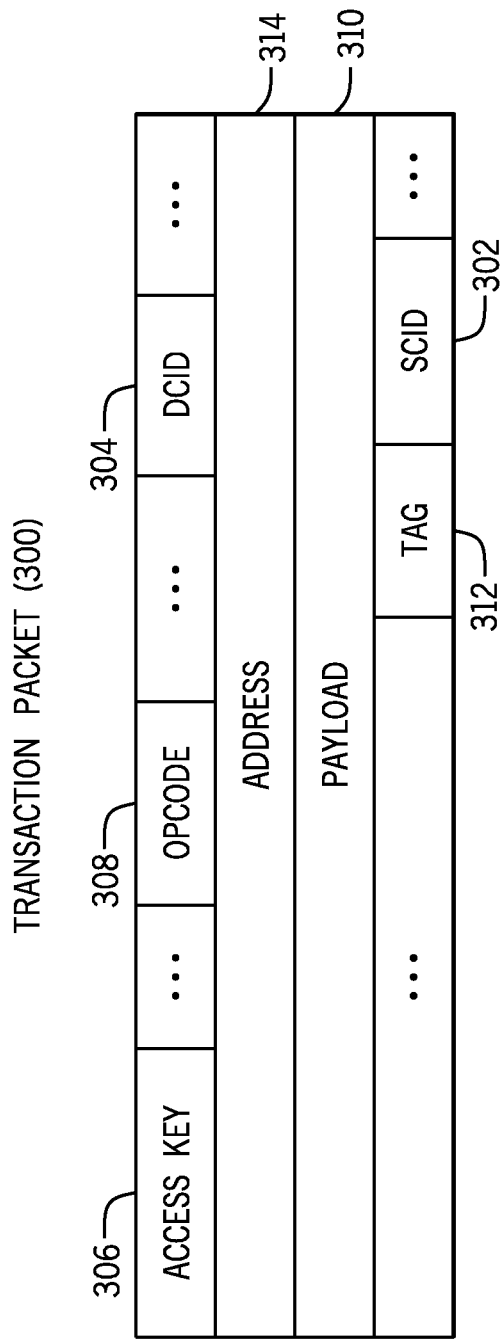
FIG. 3 is a schematic diagram of an example transaction packet according to some implementations.

A request or a response to the request can be communicated in a transaction packet through a communication fabric of a subnet. A transaction packet includes specified fields. FIG. 3 shows an example arrangement of fields that can be included in a transaction packet 300. Although example fields are shown in the transaction packet 300, it is noted that in other examples, other fields or other arrangements of fields can be included.

The transaction packet 300 includes a source component identifier (SCID) field 302 that contains an SCID. In some implementations, nodes on a communication fabric are uniquely identified using component identifiers (CIDs). Each node on the communication fabric is assigned one or multiple CIDs. In a given transaction, the source node is identified using a source SID (SCID), while the target node is identified using a destination CID (DCID). In other examples, the source node and the target node can be identified using other types of identifiers, such as IP addresses, TCP ports, and so forth.

The transaction packet 300 further includes a DCID field 304 that contains the DCID of the target node. In addition, the transaction packet 300 includes an access key field 306 that contains an access key, and an OpCode field 308 that contains an operation code. In some cases, an access key can be omitted, such as in scenarios where a transaction involves a resource that is not protected using an access key.

The transaction packet 300 also includes a payload field 310 for carrying a data payload when appropriate. For a write transaction, the payload field 310 of a request packet can include write data (that is to be written to the target node). For a read transaction, the payload field 310 of a response packet carries read data retrieved from the target node.

The transaction packet 300 also includes a tag field 312 to store a tag. A tag is an identifier that is used for associating a request with a response. For a read transaction, the response can be a read response that carries the read data. For a write transaction, the response can be a positive acknowledgement that the write was successfully completed. A tag is included in the tag field 312 of a request and also included in the response to the request, such that the request and the response can be correlated to each other.

In some implementations, the combination of an SCID and a tag provides an identifier of a transaction. Thus, within a subnet, there can only be one outstanding request with a given [SCID, Tag] combination.

The transaction packet 300 can also include an address field 314 to carry a memory address, such as the first memory address or the second memory address discussed in connection with the process of FIG. 2.

Figure 4:
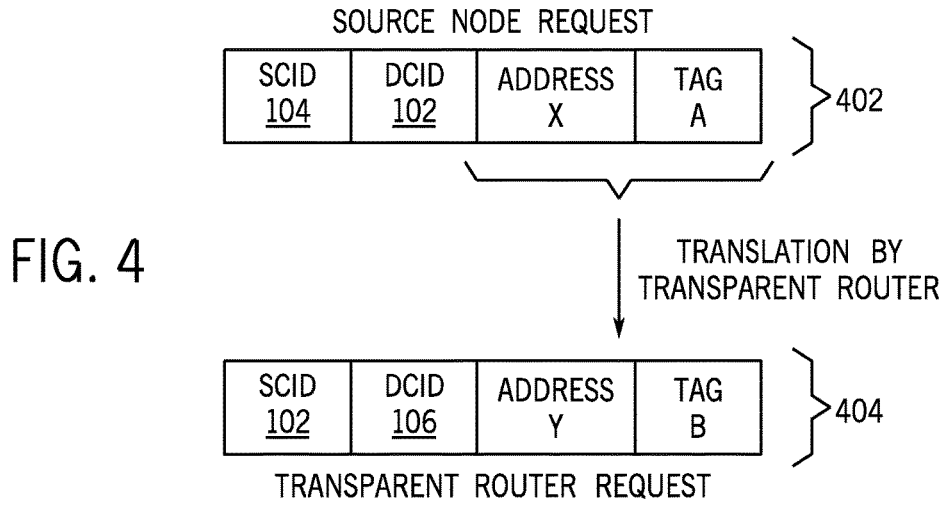
FIG. 4 is a schematic diagram illustrating an example of a translation of a source node request to a transparent router request, according to some implementations.

FIG. 4 is a schematic diagram showing an example translation of fields of a request received from a source node, as performed by the transparent router 102. The request received from the source node is depicted as a source node request 402. The source node request 402 is translated by the transparent router 102 to a transparent router request 404, which is sent by the transparent router 102 to a target node (e.g. 106) in response to the source node request 402.

The source node request 402 includes an SCID 104 (the SCID of the source node 104), a DCID 102 (the DCID of the transparent router 102), memory address X, and tag A (the tag for the transaction initiated by the source node request 402 in subnet 1). After translation by the transparent router 102, the source node request 402 becomes the transparent router request 404, which includes an SCID 102 (the SCID of the transparent router 102), a DCID 106 (the DCID of the target node 106), memory address Y, and tag B (the tag for the transaction in subnet 2).

In the translation performed according to FIG. 4, memory address X is translated to memory address Y, and tag A is translated to tag B.

Figure 5:
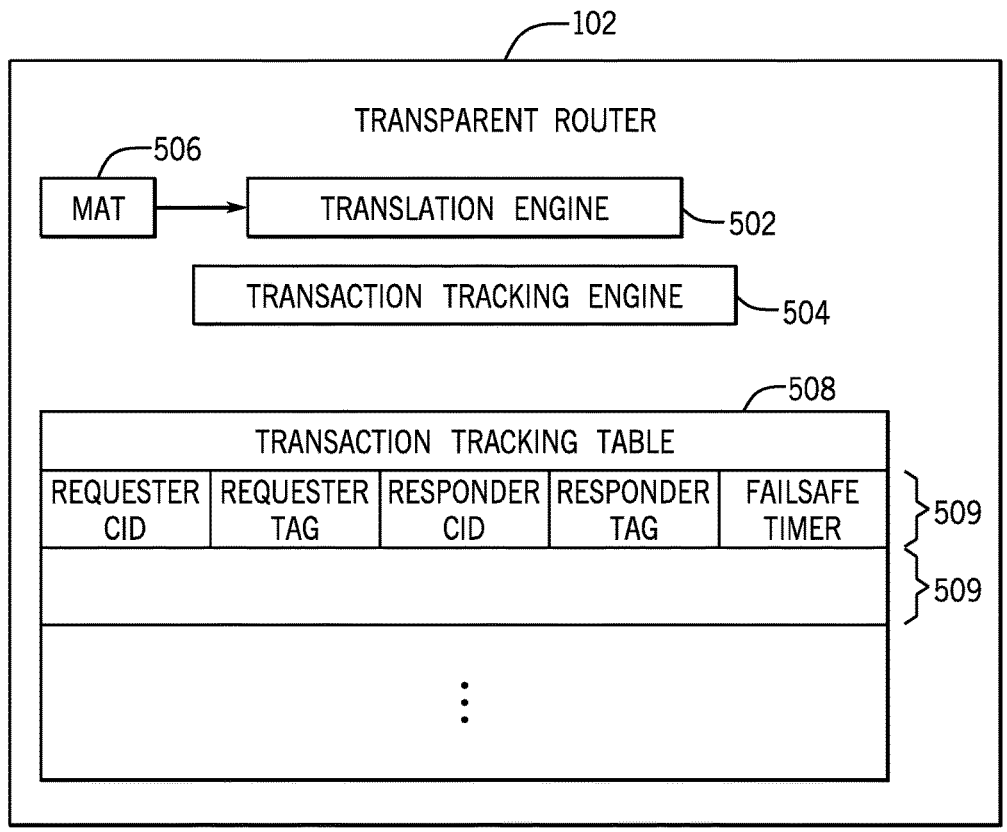
FIG. 5 is a block diagram of an example transparent router according to further implementations.

As shown in FIG. 5, in accordance with some implementations, the transparent router 102 includes an address translation engine 502 and a transaction tracking engine 504. As used here, the term "engine" can refer to a combination of machine-executable instructions and processing hardware, such as a processor (or multiple processors). Alternatively, an "engine" can refer to just processing hardware. A processor can include a microprocessor, a microcontroller, a programmable integrated circuit, a programmable gate array, a core of a microprocessor, or any other type of processing hardware.

The translation engine 502 performs translation of various fields of a request, while the transaction tracking engine 504 tracks a transaction to correlate a request with one or multiple responses of the transaction. The translation performed by the translation engine 502 is based on a memory address translation (MAT) table 506, which includes a number of entries. Each entry of the MAT 506 maps a memory address of a first subnet to a corresponding address of a second subnet. The entries of the MAT 506 can be populated by an administrative entity of a network, such as a human network administrator or a network controller.

More specifically, in some examples, each entry of the MAT 506 can map a memory address contained in the address field 314 of the transaction packet 300 for a request to the following information of the target subnet: [DCID, Memory Address, Access Key] (assuming that an access key is used). If an access key is not used, then the address contained in the address field 314 is translated to [DCID, Memory Address] in the target subnet. The DCID mapped from the memory address identifies the target node in the target subnet.

As requests for respective transactions are received, the transaction tracking engine 504 adds (creates) entries 509 for the respective transactions to a transaction tracking table 508. Each entry 509 of the transaction tracking table 508 can include various values, including a requester CID 510 (the CID of the requester, such as the source node 104), a requester tag 512 (the tag included in the request received from the requester, such as tag A in the source node request 402 of FIG. 4), a responder CID 514 (to identify the responder, such as the target node 106), and the responder tag 516 (the tag included in the transparent router request, such as tag B in the transparent router request 404 in FIG. 4). Also, if the request from the source node includes an access key, the access key is also added to the corresponding entry 509 in the transaction tracking table 508.

Using a given transaction tracking table entry 509, the transaction tracking engine 504 can correlate a response from the responder to the request received from a requester. The response from the responder would include the CID of the responder, along with the responder tag, which can be used to retrieve the respective entry 509 from the transaction tracking table 508 to correlate to the transaction identified by the requester CID and the requester tag. Note that in subnet 1 (the subnet that the source node is part of), the combination of the requester CID and the requester tag uniquely identifies a respective transaction in subnet 1.

If the given transaction tracking table entry 509 also includes an access key, then the access key is also used in correlating the response to the transaction.

Although reference is made to tables (506 and 508 in FIG. 5), it is noted that in other examples, the MAT 506 and transaction tracking table 508 can be implemented using other types of data structures.

In some examples, as further shown in FIG. 5, each entry 509 of the transaction tracking table 508 includes or is associated with a failsafe timer 510. The failsafe timer 510 can be part of each respective entry 509, or alternatively, the failsafe timer 510 can be separate from the entry 509.

The failsafe timer 510 of a respective entry 509 is started in response to the transmission of a transparent router request by the transparent router 102 to the target node. Assuming that the transparent router request is validated at the target node and the target node executes an operation specified by the transparent router request, the transparent router 102 receives a response sent by the target node. The transparent router 102 validates the received response, locates the respective entry 509 of the transaction tracking table 508, and produces a response to be sent from the transparent router 102 to the source node. Also, the transparent router 102 resets the failsafe timer 510.

If the failsafe timer 510 expires before the transparent router 102 receives a response to the transparent router request sent by the transparent router 102 to the target node, then the respective entry 509 of the transaction tracking table 508 is removed, and an error handling procedure can be performed. The error handling procedure can include sending an error message to the source node. By using the failsafe timer 510, stranded resources in the transaction tracking table can be avoided.

Figure 6A:
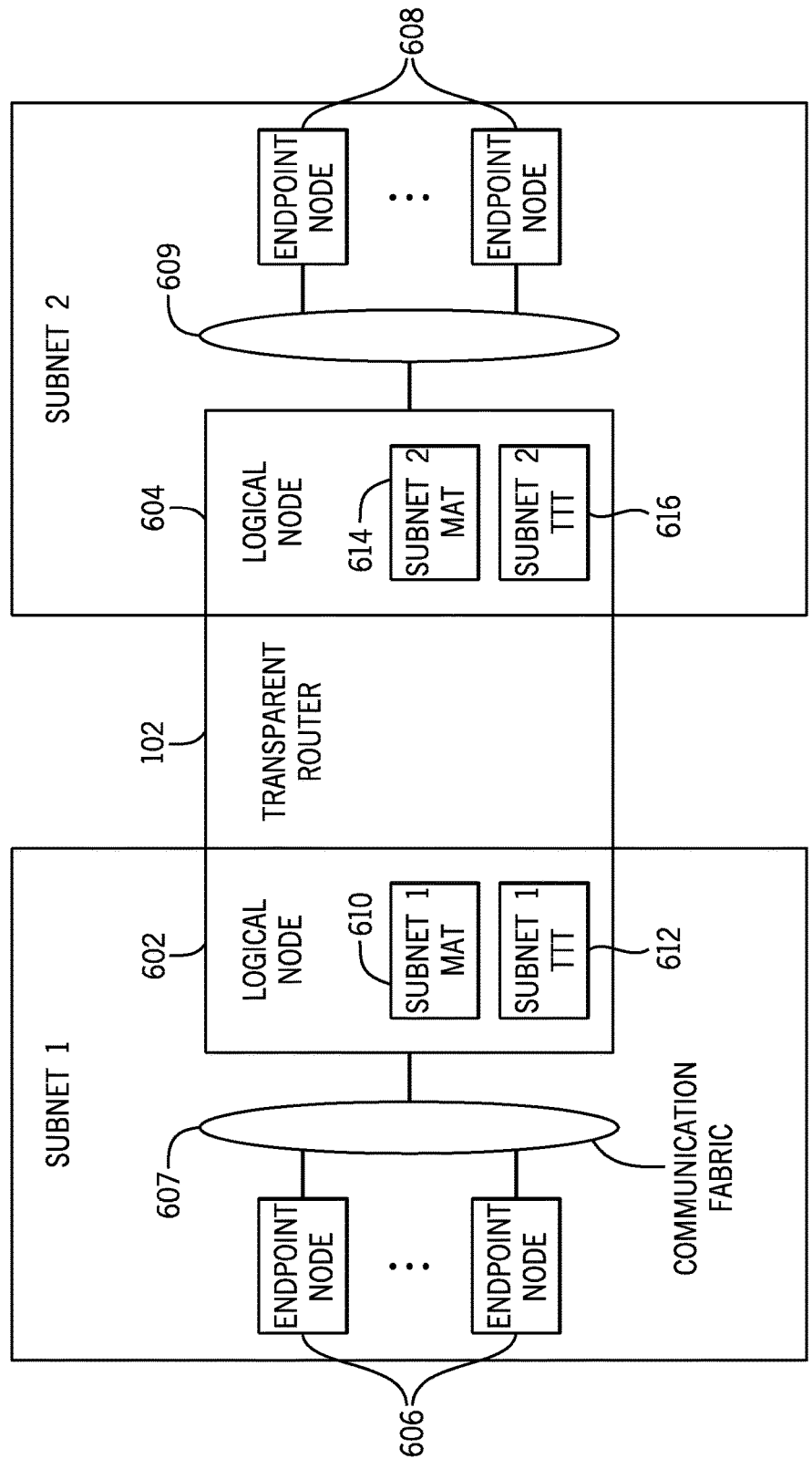
FIG. 6A is a block diagram of another example arrangement including a transparent router connected between subnets, according to further implementations.

FIG. 6A shows the transparent router 102 divided into two logical nodes 602 and 604. The logic node 602 is part of subnet 1, while the logical node 604 is part of subnet 2. The transparent router logical node 602 in subnet 1 can communicate, over a communication fabric 607 that supports memory semantic operations, with endpoint nodes 606 in subnet 1, while the transparent router logical node 604 in subnet 2 can communicate, over a communication fabric 609 that supports memory semantic operations, with endpoint nodes 608 in subnet 2.

For any transaction involving endpoint nodes in subnets 1 and 2, from the perspective of an endpoint node 606

As further shown in FIG. 6A, two sets of MATs and transaction tracking tables (TTTs) are included in the transparent router 102. A subnet 1 MAT 610 and subnet 1 transaction tracking table 612 are used for requests originated in subnet 1, while a subnet 2 MAT 614 and subnet 2 transaction tracking table 616 are used for requests originated in subnet 2.

Figure 6B:
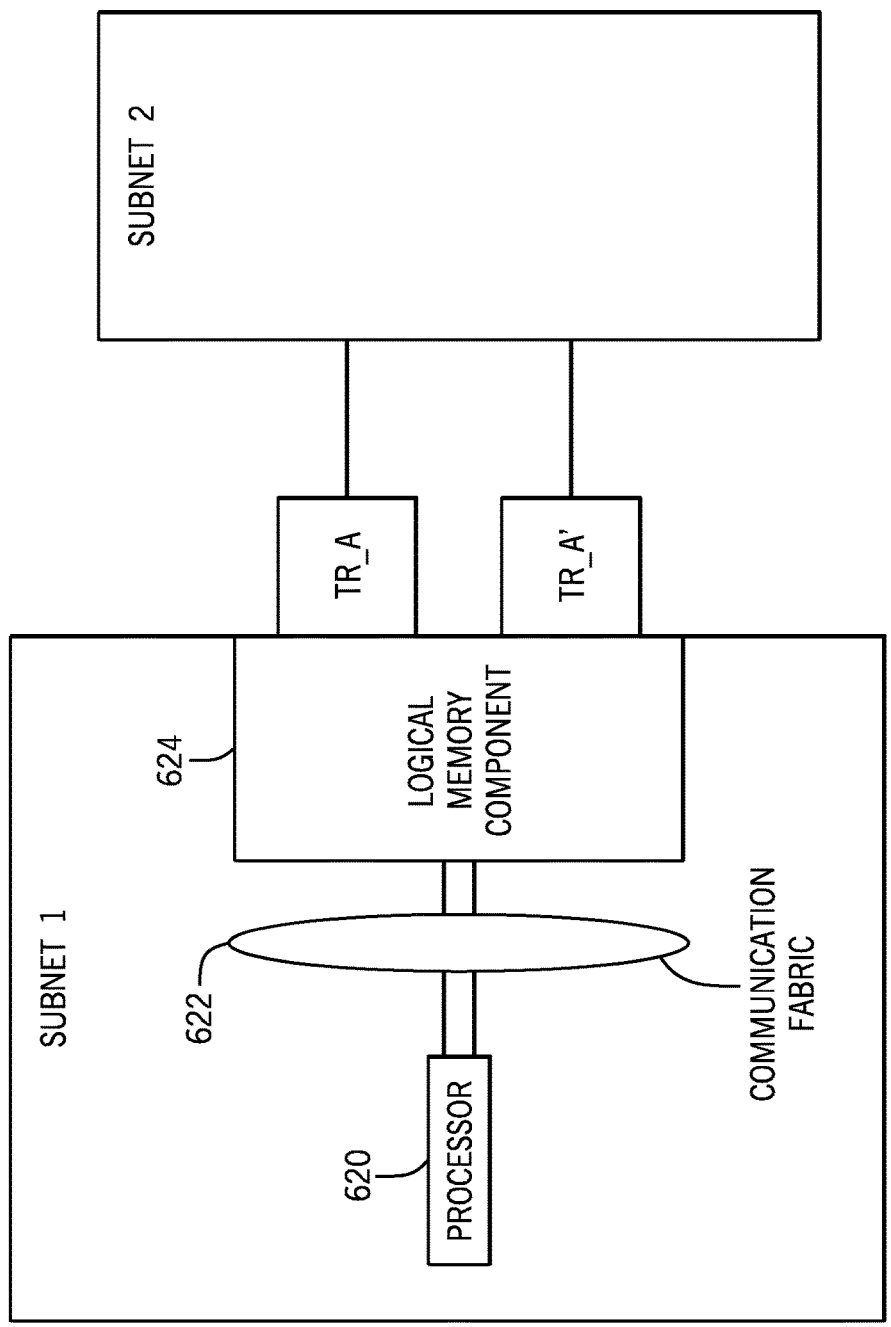
FIG. 6B is a block diagram of a further example arrangement that includes multiple redundant transparent routers, according to alternative implementations.

FIG. 6B shows the use of redundant transparent routers TR_A and TR_A' to provide resiliency in case of failure of one of the redundant transparent routers. Subnet 1 in FIG. 6B includes a processor 620 that can access a logical memory component 624 (that includes the redundant transparent routers TR_A and TR_A'). The logical memory component 624 can be identified by a single component identifier in subnet 1. A memory request issued by the processor 620 to the logical memory component 624 over a communication fabric 622 is translated by a transparent router (TR_A or TR_A', depending on which is the primary transparent router and which is the standby transparent router) into a translated memory request that is issued to a physical memory component (or components) in subnet 2.

Assuming that transparent router TR_A is the primary transparent router, then failure of the transparent router TR_A will cause the processor 620 to be notified of an event that causes the processor 620 to initiate transaction recovery. In some examples, the transaction recovery performed by the processor 620 can include the processor 620 retransmitting outstanding requests on an alternative path that leads to the transparent router TR_A'. The transparent router TR_A' then performs the translation/correlation tasks discussed above for the requests sent by the processor 620.

According to the arrangement of FIG. 6B, the processor 620 has multiple redundant paths to the logical memory component 624, which provides resiliency while still maintaining transparency of components in subnet 2 to the processor 620.

The logical memory component 624 can be implemented with a single hardware component, or multiple hardware components that include the respective transparent routers TR_A and TR_A'.

FIG. 7 is a message flow diagram that shows the communication of requests and responses according to some implementations of the present disclosure. The source node 104 transmits (at 702) a request REQ0 to the transparent router 102, which translates (at 704) field values (e.g. memory address, tag) of the received request REQ0 to respective field values to be included in a request TR_REQ0.

In response to the request REQ0, the transparent router 102 also adds (at 706) an entry to a transaction tracking table (e.g. 508 in FIG. 5). The transparent router 102 sends (at 708) the request TR_REQ0 to the target node 106. In response to the request TR_REQ0, the target node 106 performs the requested operation(s).

The target node 106 sends (at 712) a response TR_RSP0 to the transparent router 102, where the response TR_RSP0 relates to the operation(s) performed (at 710). For example, the response TR_RSP0 can include read data or a positive acknowledgment of a write operation.

Using a CID and tag included in the response TR_RSP0, the transparent router 102 retrieves a corresponding entry of the transaction tracking table to correlate the response TR_RSP0 to the respective transaction corresponding to the request REQ0.

The transparent router 102 then produces (at 716) a response RSP0 corresponding to TR_RSP0, and the transparent router 102 sends (at 718) the response RSP0 back to the source node 104.

Note that the transparent router 102 does not have to store the received source node request (REQ0), which reduces resource consumption at the transparent router 102.

In further implementations, the transparent router 102 is able to support advanced transactions. In some examples, a specific address range or specific address ranges can indicate an advanced transaction. In other examples, other types of indicators of advanced transactions can be used.

One type of advanced transaction is a transaction in which the transparent router 102 transforms a single operation into multiple operations (e.g. multiple smaller operations). For example, a read request to read data of a particular size is transformed into multiple smaller read requests to read data of smaller sizes, which can be performed by multiple target nodes in parallel to enhance parallelism.

Another type of advanced transaction is a transaction in which a given request received from a source node is translated to operations performed by multiple different types of target nodes. For example, in response to the given request, the transparent router 102 can initiate the performance of the advanced transaction by sending a first request to a first target node to perform a first operation. This first operation can produce result data that is sent from the first target node back to the transparent router 102. The transparent router 102 can then send a second request to a second target node, where the second request can include the result data from the first operation performed by the first target node. The second request specifies a second operation at the second target node.

In some examples, the first target node can be an accelerator to perform a specific computation. An accelerator is a component that is used to perform computations on behalf of another component. Examples of computations that can be performed by the accelerator include deduplication (to deduplicate data, in which identical copies of data are identified and only one of the identified identical copies is stored), malware detection (to detect malware, such as a virus, a worm, or any unauthorized code), data analysis (to perform analysis of data), an auditing service (to verify if a requester has permission to perform an operation, to create an audit trail, etc.), mathematical calculations (such as computing a running total or running average), or other computations.

Result data produced by the computation performed at the accelerator can then be sent to the second target node, such as a memory, for storage.

In some implementations, use of a transparent router can also allow for support of more robust servicing or management of components in a network. For example, components in a given subnet can be serviced or replaced without downtime of an application running in components of another subnet. Also, components can be power managed to conserve power by comprehending their access patterns and adjusting power accordingly. In addition, adding components to a subnet (or adding a new subnet) can enable the provisioning of additional components to processors or applications. In addition, transparent migration of memory components between different tiers of memory is possible.

Figure 8:
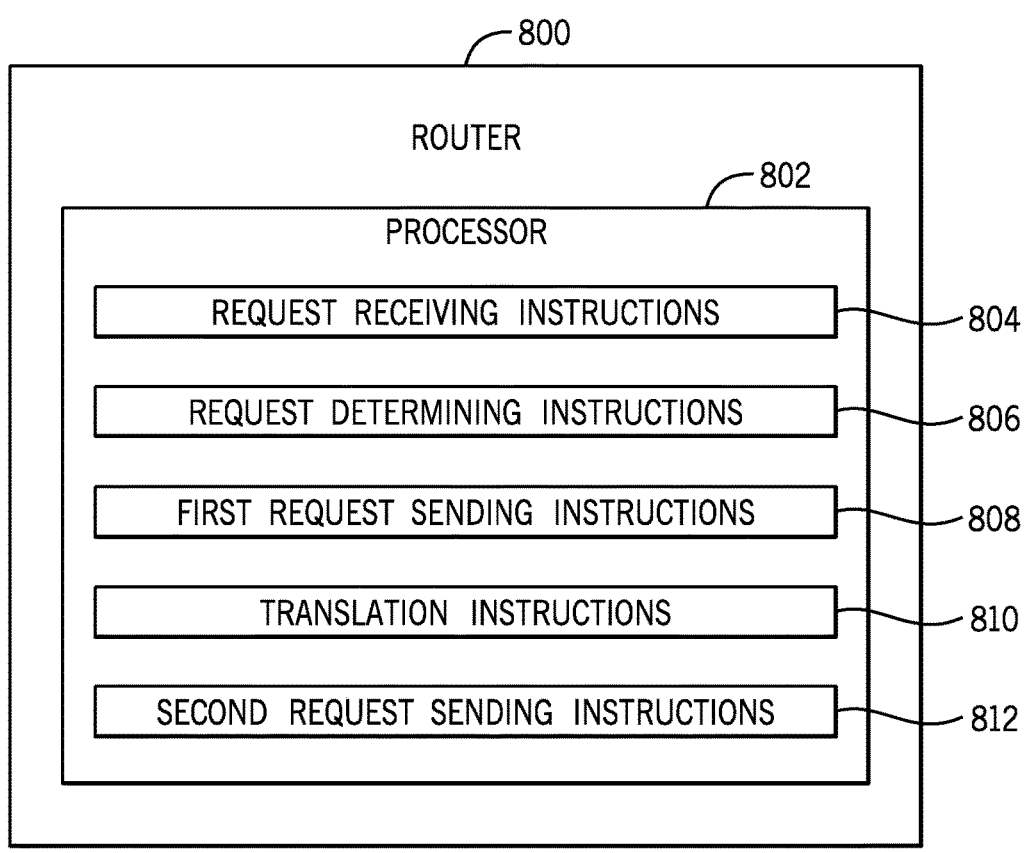
FIG. 8 is a block diagram of an example router according to some implementations.

FIG. 8 is a block diagram of a router 800 (e.g. a transparent router as discussed above) according to some implementations. The router includes one or multiple processors

802. The processor(s) 802 can execute various machine-executable instructions, including request receiving instructions 804 (to receive a request including a first memory address from a source node in a first subnet), request determining instructions 806 (to determine whether the request corresponds to a transaction involving multiple target nodes), first request sending instructions 808 (to send a first request to a target node to perform a first operation in response to determining that the request corresponds to a transaction involving multiple target nodes), translation instructions 810 (to translate the first memory address in the received request to a second memory address that is different from the first memory address), and second request sending instructions 812 (to send a second request including the second memory address to a second target node).

Figure 9:
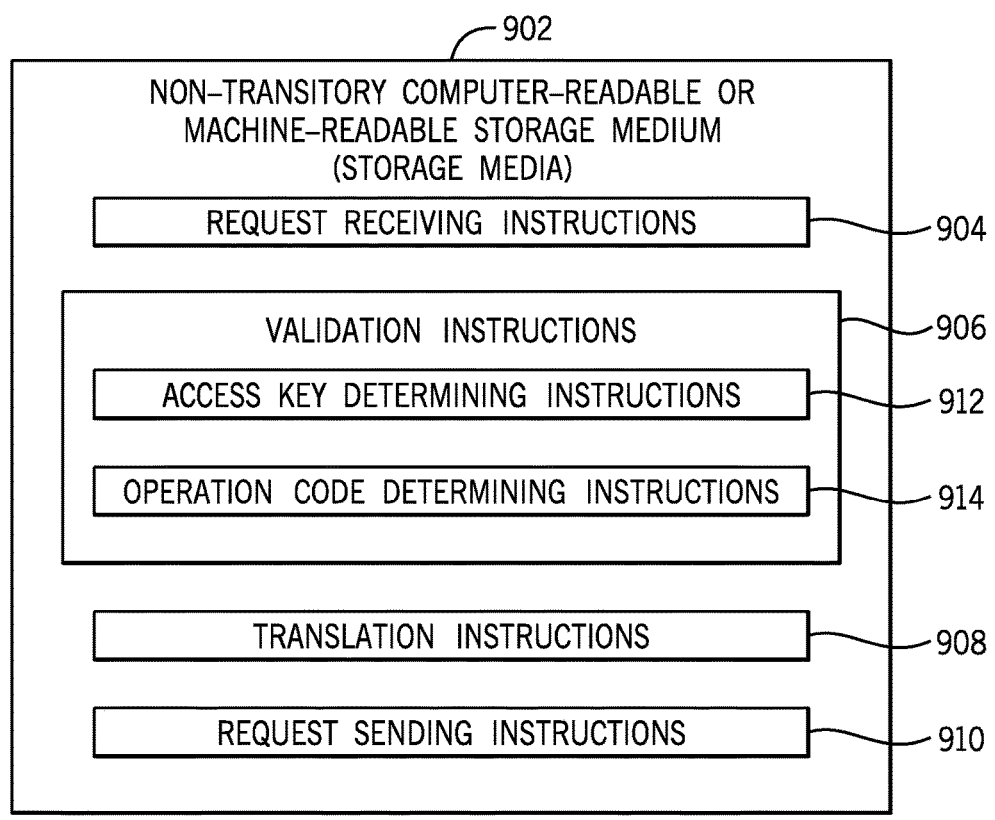
FIG. 9 is a block diagram of example machine-readable instructions stored in at least one machine-readable storage medium, according to further implementations.

FIG. 9 is a block diagram of a non-transitory computer-readable or machine-readable storage medium (or storage media) 902 according to some implementations. The storage medium (or storage media) 902 can be part of a transparent router as discussed above. Alternatively, the storage medium (or storage media) 902 can include a removable storage medium (or storage media) that is removably connectable to the transparent router. As yet another example, the storage medium (or storage media) 902 can be at a remote site (e.g. remote server0 that is accessible by the transparent router to download the machine-executable instructions of the storage medium (or storage media) 902 from the remote site to the transparent router.

The storage medium (or storage media) 902 can store request receiving instructions 904 (to receive a request including a first memory address from a source node in a first subnet), validation instructions 906 (to perform a validation procedure), translation instructions 908 (to translate the first memory address in the request to a second memory address that is different from the first memory address), and a request sending instructions 910 (to send the request including the second memory address to a target node in the second subnet). The machine-executable instructions stored in the storage medium (or storage media) 902 are executable by at least one processor, such as at least one processor in the router 102, to perform respective tasks.

The validation instructions 906 include access key determining instructions 912 to determine that an access key associated with the received request authorizes an operation in the second subnet requested by the received request, and operation code determining instructions 914 to determine that the received request has a valid operation code.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    receiving, by a router, a first request including a first memory address from a source node in a first subnet;
    validating, by the router based on information in the request, that the request corresponds to a valid operation in a second subnet involving plural target nodes;
    translating, by the router, the first memory address in the request to a second memory address that is different from the first memory address;
    sending, by the router, a second request to a first target node of the plural target nodes to perform a first operation; and
    sending, by the router, a third request including the second memory address and result data produced by the first operation to a second target node of the plurality target nodes.

2. The method of claim 1, wherein the validating comprises determining, based on an access key of the request, whether access to a resource associated with the first target node is authorized.

3. The method of claim 1, wherein the validating comprises determining whether an operation code in the request is supported.

4. The method of claim 1, wherein the request including the first memory address is received from the source node over a communication fabric that is part of the first subnet, and the third request including the second memory address is sent to the first target node over a communication fabric that is part of the second subnet, and wherein the communication fabrics of the first and second subnets support memory semantic operations.

5. The method of claim 1, further comprising:
    in response to the first request received from the source node, creating, by the router, an entry in a transaction tracking data structure that includes a tag in the first request received from the source node;
    receiving, by the router from the first target node, a response to the second request sent by the router; and
    using, by the router, the entry in the tracking data structure to correlate the response to the first request received from the source node.

6. The method of claim 5, further comprising: translating, by the router, the tag in the first request to a different tag, wherein the second request sent to the first target node includes the different tag; and adding, by the router, the different tag to the entry in the tracking data structure.

7. The method of claim 5, further comprising:
    adding, to the entry in the tracking data structure, an access key associated with the second request sent to the first target node, the access key useable to control access privilege to a resource associated with the first target node, wherein correlating the response to the request is based at least one the tag and the access key in the entry in the tracking data structure.

8. The method of claim 5, further comprising:
starting, by the router, a timer in response to sending the request including the second memory address to the first target node;
resetting the timer upon receiving the response to the request sent to the first target node; and
removing, by the router, the entry from the tracking data structure in response to expiration of the timer.

9. The method of claim 1, wherein the router is a first router that is part of a logical component that further includes a second router, the first and second routers to provide redundancy.

10. The method of claim 1, wherein the router comprises a transparent router which is to interconnect multiple subnets without endpoints in the first subnet being aware of endpoints in the second subnet.

11. A router comprising:
at least one processor to:
receive a request including a first memory address from a source node in a first subnet;
determine whether the request corresponds to a transaction involving plural target nodes; and
in response to the determining, send a first request to a first target node of the plural target nodes to perform an operation, translate the first memory address in the received request to a second memory address that is different from the first memory address, and send a second request including the second memory address to a second target node of the target nodes in a second subnet, the second request including result data produced by the operation performed by the first target node.

12. The router of claim 11, wherein the first target node comprises an accelerator to produce the result data, and the second target node comprises a memory to store the result data.

13. The router of claim 11, wherein the operation includes deduplication of data.

14. The router of claim 11, wherein the operation is selected from among malware detection, data analysis, auditing, and mathematical calculation.

15. The router of claim 11, wherein the router comprises a transparent router which is to interconnect multiple subnets without endpoints in the first subnet being aware of endpoints in the second subnet.

16. The method of claim 11 further comprising receiving the result data produced by the operation performed by the first target node.

17. An article comprising at least one non-transitory computer-readable storage medium storing instructions that upon execution cause a router to:
receive a request including a first memory address from a source node in a first subnet;
perform a validation procedure comprising:
determining that an access key associated with the request authorizes an operation in a second subnet requested by the request, and determining that the request has an operation code that is supported by plural target nodes;
in response to validation of the request by the validation procedure, translate the first memory address in the request to a second memory address that is different from the first memory address; and
send the request including the second memory address to a first target node of the plural target nodes in the second subnet
receive result data produced in response to the request including the second memory address;
send the result data to a second target node of the plural target nodes.

18. The article of claim 17, wherein the instructions upon execution cause the router to:
in response to the request received from the source node, create an entry in a tracking data structure that includes an identifier of the source node and a tag in the request received from the source node;
receive, from the first target node, a response to the request sent by the router, the response including the result data; and
use the entry in the tracking data structure to correlate the response to the request received from the source node.

19. The article of claim 17, wherein the router comprises a transparent router which is to interconnect multiple subnets without endpoints in the first subnet being aware of endpoints in the second subnet.

* * * * *